Aug. 28, 1934.　　　　F. KOHNLE　　　　1,971,963
PIN TICKETING MACHINE
Filed Jan. 30, 1933　　　10 Sheets-Sheet 1

Fig. 1.

INVENTOR
Frederick Kohnle,
BY
Wood & Wood,
ATTORNEYS

Aug. 28, 1934.  F. KOHNLE  1,971,963
PIN TICKETING MACHINE
Filed Jan. 30, 1933  10 Sheets-Sheet 3

Fig. 3.

INVENTOR
Frederick Kohnle,
BY Wood & Wood,
ATTORNEYS

Aug. 28, 1934.    F. KOHNLE    1,971,963
PIN TICKETING MACHINE
Filed Jan. 30, 1933    10 Sheets-Sheet 6

INVENTOR
Frederick Kohnle,
BY
Wood & Wood,
ATTORNEYS

Aug. 28, 1934.　　　F. KOHNLE　　　1,971,963
PIN TICKETING MACHINE
Filed Jan. 30, 1933　　　10 Sheets-Sheet 8

INVENTOR
Frederick Kohnle,
BY Wood & Wood,
ATTORNEYS

Aug. 28, 1934.　　　　F. KOHNLE　　　　1,971,963
PIN TICKETING MACHINE
Filed Jan. 30, 1933　　　10 Sheets-Sheet 10

INVENTOR
Frederick Kohnle,
BY Wood & Wood,
ATTORNEYS

Patented Aug. 28, 1934

1,971,963

UNITED STATES PATENT OFFICE 1,971,963

PIN TICKETING MACHINE

Frederick Kohnle, Dayton, Ohio, assignor to The Monarch Marking System Company, Dayton, Ohio, a corporation of Ohio Application January 30, 1933, Serial No. 654,298

21 Claims. (Cl. 1—1)

This invention relates to a machine for price marking tags and pinning the tags to fabric merchandise and the like, in which an ordinary commercial pin is utilized for attaching the tag to the merchandise.

The machine operates upon tags arranged in gang, or a continuous strip, reel wound, the strip notched or slitted in one or both of its longitudinal edges at definite spacing to individualize the tags and for partial severance, and in a preferred form, the strip is slotted intermediately between the marginal notching to provide shoulders for engagement with a feeding pawl or finger for advancing the strip in step degrees to bring the tags consecutively in relation to printing and severing mechanism, and to advance the foremost severed tags to a station for pinning the tag to the merchandise.

The pin used for attaching the tag to the merchandise is packed upon a paper strip in a manner following the general practice of papering pins in which the pins in spaced parallelism stick through longitudinal corrugations in the strip and the strip reel wound.

In the present machine the pin carrying strip is advanced or fed to bring the pins consecutively to a magazine for extracting the pin from the strip, and from which the pins are consecutively transferred to the tags for securing the tags to the merchandise. The feeding advance of the strip is accomplished by a reciprocating ratchet having a toothed engagement with one or a plurality of pins of the strip for making a coupling connection with the strip and intermittently advancing the strip with each reciprocating stroke of the ratchet. The pins are packed on the strip with their heads freely exposed and extending beyond the longitudinal edge of the strip for convenient engagement by an extractor reciprocable to pull the pins from the strip and transfer them into a magazine and from which they are passed successively into the tag and merchandise appropriately held for passing the pins therethrough in a horizontal plane for pinning the tag to the merchandise.

As it is desirable to guard the pin point, it, in a pinning operation, is pricked or pierced into a tag either from the face or under side and the point may also be slightly deformed for added securance.

An object of the invention is to provide a compact and substantially automatic machine which will feed a tag strip, print upon the individual tags of the strip, sever the tags from the strip, position the severed tags successively for attachment to pieces of fabric or the like merchandise, and attach the tag to the merchandise with an ordinary pin taken from a pin carrying strip or magazine operating to successively pass or drive the pins through a tag and merchandise successively presented for fastening the tags to the merchandise.

Another object of the invention is to provide a simple, compact and efficient device for automatically feeding a pin carrying strip and successively removing or extracting the pins from the strip for consecutive magazine loading, the magazine acting upon each pin for fastening tags to merchandise successively presented for price marking.

Various other features and advantages of the invention will be more fully set forth in the description of the accompanying drawings in which.

The machine as illustrated is of a type as shown in a prior patent issued to me May 1, 1928, No. 1,667,810, for "Ticket or tag attaching machine", employing an electric motor drive and the transmission under clutch control, the clutch operated by either one of a pair of finger depressed push rods within convenient access of the operator and preferably in relation to a reciprocating clamping plunger serving as work support over which the merchandise to be ticketed is placed and compressed with the tag against a stationary die for bowing the tag and merchandise to permit a pin to be driven through the same in a horizontal line.

Figure 3:
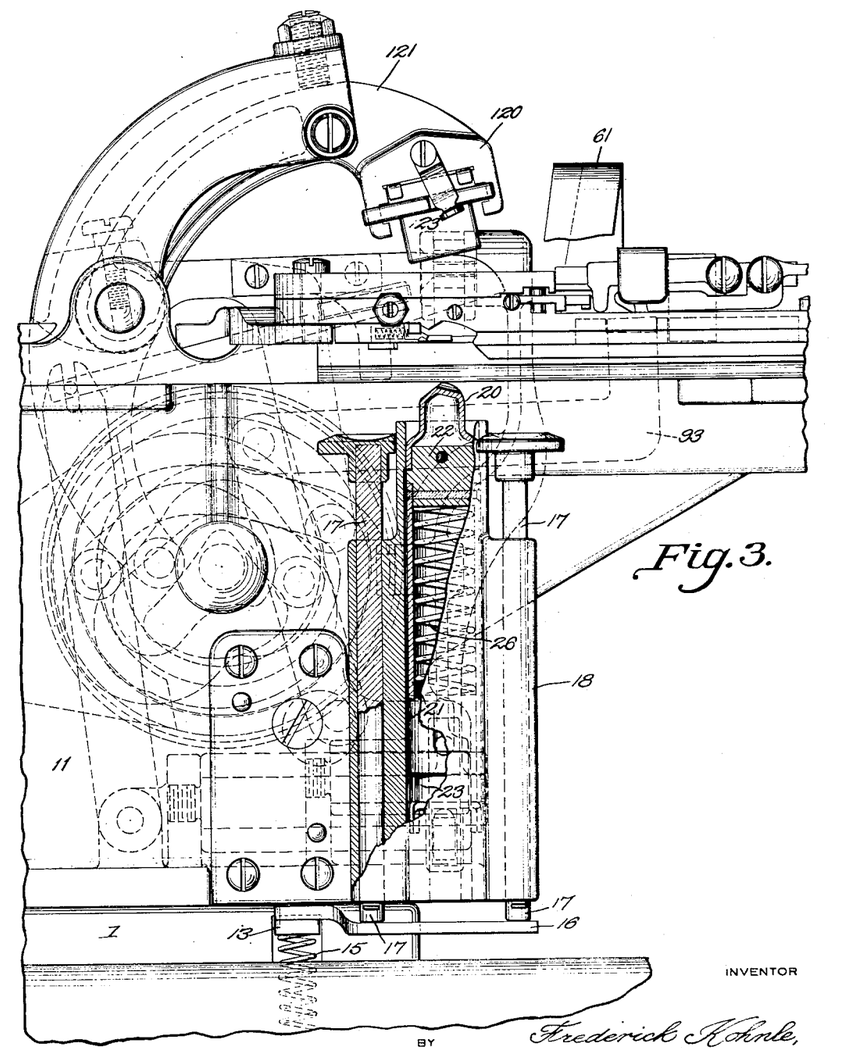
Figure 3 is an enlarged front elevation of a portion of the forward end of the machine with a portion of the anvil upon which the merchandise to be ticketed is placed, partly in section as well as one of the clutch control push rods at one side of the plunger, which at its upper end supports the anvil.
Figure 4:
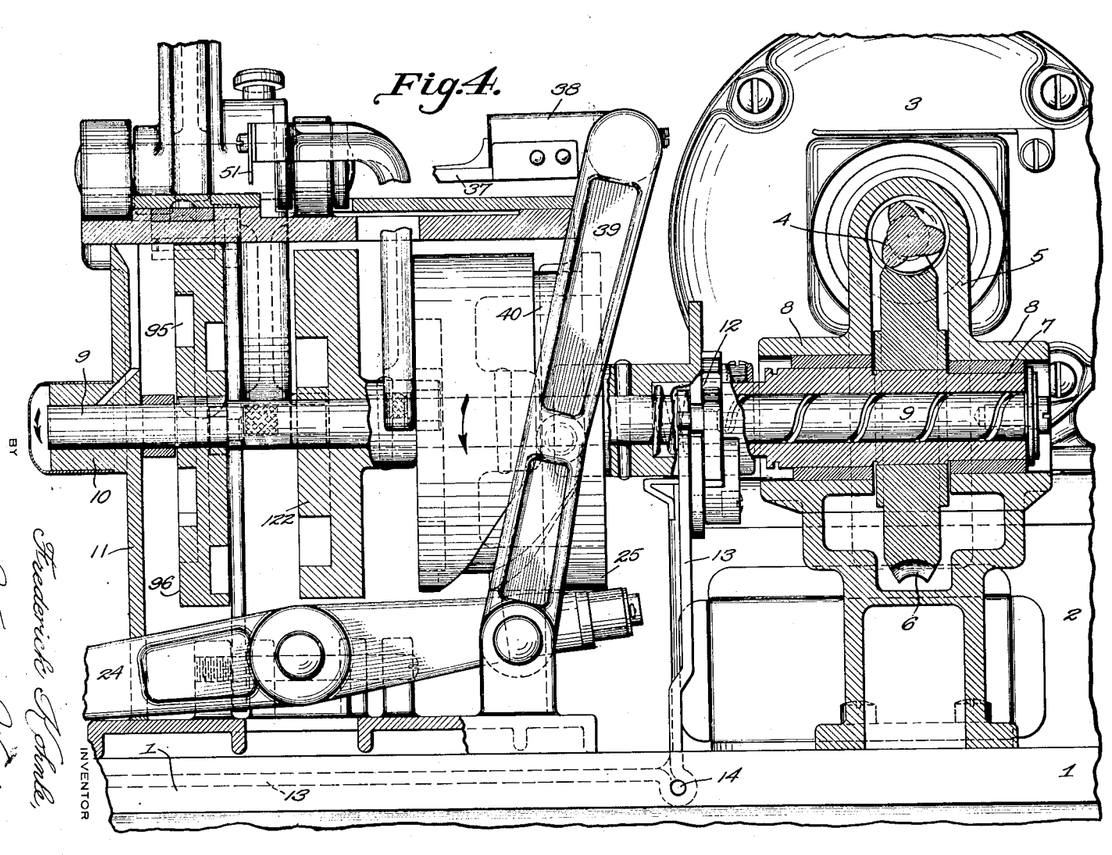
Figure 4 is an enlarged section on line 4—4, Figure 2.

Referring to the drawings, Figure 4, 1 indicates a base plate for supporting the machine, having a platform 2 providing an elevated support for the electric motor 3. One end of the motor armature shaft is provided with a worm 4 housed within the upper end of the transmission casing 5 mounted upon the base 1. The worm 4 is in mesh with a worm wheel 6 fixed upon a sleeve shaft 7 journalled in bearings 8—8 of the transmission casing 5. The end of a driven shaft 9 is concentrically journalled within the sleeve 7, while the opposite end of the shaft 9 is journalled in a bearing 10 in a casing 11 of the ticketing machine. The driving sleeve 7 and driven shaft 9 are clutched together by a ratchet type of clutch 12 for a single revolution control upon the tripping of clutch controlling mechanism, the controlling mechanism permitting a continuous operation of the shaft 9 at the will of the operator. The clutch 12 is tripped by an L shaped lever 13 pivoted at 14 within the base of the machine and the lever is spring pressed for normally holding it in a released position by a spring 15 beneath the forward horizontal end of the lever 13 (see Figure 3). The control lever 13 at its forward end has a lateral extension 16 engaged by the lower ends of a pair of vertically disposed push rods 17—17 slidably supported within a bracket 18 fixed to the front side of the casing 11. The push rods 17 are preferably disposed at relative opposite sides of an anvil plunger upon which the merchandise is placed, elevating and compressing the merchandise against the tag sustained beneath the stationary die cooperating with the plunger for clamping the parts in a curved or bowed condition for receiving the pin, pinning the tag to the merchandise.

By pressing either of the push rods 17 the control lever is actuated, tripping the clutch for either a single revolution or continuous operation of the machine. Insofar as described, the present machine is similar to that disclosed in the aforesaid prior patent.

The tags used in the machine are supplied in gang or strip form, the strip advanced intermittently to consecutively feed and position the tags after price marking and severance from the strip appropriately beneath a stationary die or clamp block 19 which cooperates with the anvil head of a vertically reciprocable plunger to clamp the tag and merchandise therebetween in a bowed or curved form for driving or passing a pin longitudinally in a straight line several times through the tag and merchandise.

The stationary die is formed to guide and direct the point end of the pin, after it has been passed through the tag and merchandise for the necessary number of times to pin the tag to the merchandise, and to pierce the point of the pin into the upper side of the tag either for protecting or guarding the point or again pass the pin through the tag and bring the same on the under side of the tag and thence in an upward direction for imbedding the point into the under side of the tag, the latter method being the one preferably employed and herein disclosed. The lower side of the stationary die 19 which is in the form of a removable plate secured within a support for interchangeability or renewal, is recessed or concave, to appropriately bow or curve the tag and merchandise when clamped or compressed thereagainst for pinning the two together and the portions of the support adjacent the die are correspondingly recessed to increase the clamping surface and serving with the die to bow or bend the tag and merchandise for a pinning operation.

A movable die or anvil 20 constituting a head of a plunger 21 of shell form, is slidably mounted within a bore in the bracket 18. The die or anvil 20 at its upper side or top is notched or grooved to provide a passageway for guiding and directing the pin as it is passed or driven through the tag and merchandise. The plunger and anvil as a unit is reciprocated for cooperating with the stationary die to clamp the tag and merchandise in a bowed condition for the pinning operation.

The plunger 21, being preferably of shell form has a plug 22 engaged into its upper end and secured thereto. The plug is counter-turned to provide an annular flange abuttingly engaging the end edge of the shell and a reduced diameter portion telescoping into the shell and pinned thereto, the plug at its opposite end telescoping into the anvil 20 which is in the form of a shell or stamping, and pinned thereto unitarily combining the anvil and plunger. This construction permits interchanging or removal of the anvil for renewal or repair.

The plunger at its lower end is slotted to receive a pin extending laterally through a stem 23 engaged into the lower end of the shell keying the shell to the stem against rotation. The lower end of the stem 23 is provided with a stirrup for connecting the stem and plunger to a lever 24 suitably pivoted to the frame of the machine as shown in Figure 4 and contacting with the cam of the cam wheel 25 fixed upon the driven shaft 9. The upper end of the stem 23 engages with one end of a spring 26 housed within the plunger shell, the opposite end of the spring engaging against the cap plug 22, the spring providing a yielding connection between the plunger shell and stem for compressively holding the anvil against the merchandise, tag, and stationary die, and accommodate for various thicknesses of material ticketed.

Figure 1:
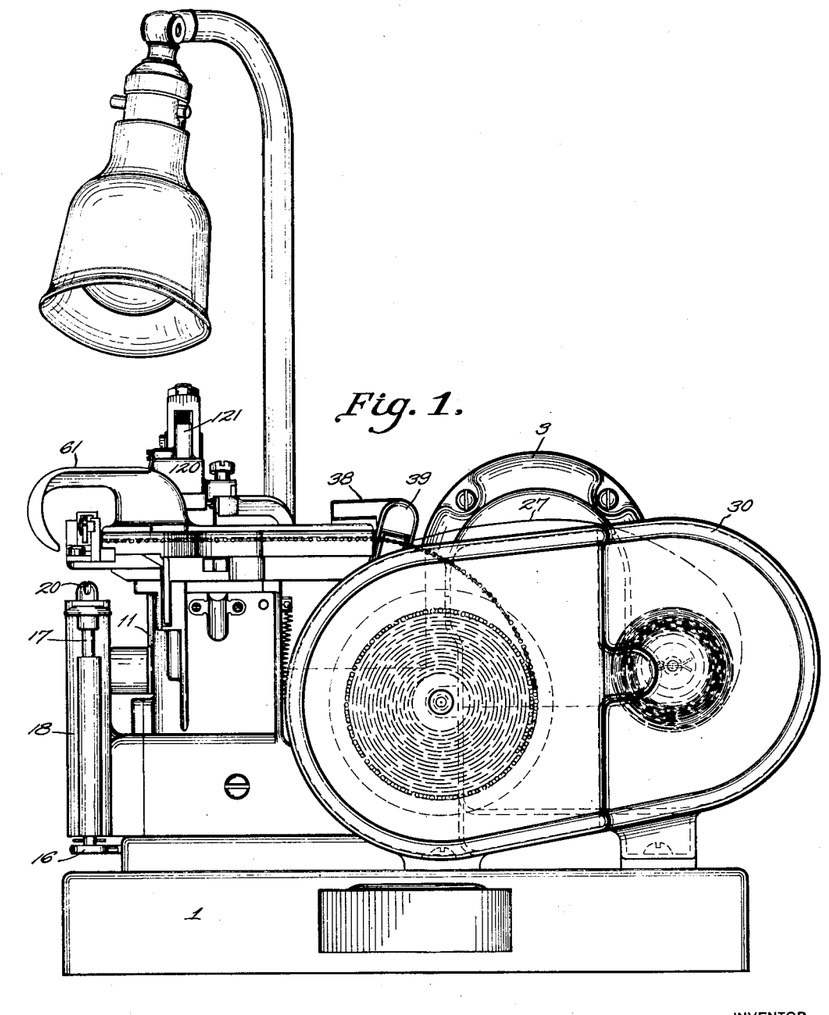
Figure 1 is a side elevation of the machine.

The tags preferably are arranged in gangs or strip form, the tags in the strip 27 defined by edge notching 28 in the opposite longitudinal edges of the strip and a rectangular slot 29 centrally of the strip and relatively aligned with a pair of edge notches in the opposing edges of the strip. The strip is reel wound and the reel housed within a casing 30 at one side of the machine (see Figure 1) with the coil of the reel journalled upon a stationary pin or spindle. The strip is threaded through an opening in the top of the casing and extends forwardly upon a track or table to be engaged by reciprocating feed mechanism for intermittently advancing the strip the width or length of the tag to bring the edge notching successively in registration with the cutter for severing the tag from the strip and positioning the foremost tag to be severed from the strip upon a printing platen beneath a swinging printing head for printing the desired marking data upon the tag and for advancing the severed tag to the pinning mechanism of the machine. The strip as it is drawn from the reel travels within a channel or way 31 of a rail section 32 fixed upon the table 33 of the machine (see Figures 5, 23 to 26 inclusive).

The track section 33 has a closure plate 34 fixed thereto covering the channel for confining the strip against vertical displacement within the channel. The channel toward the forward portion has a tension plate or spring leaf 35 fixed to the rail section 32 with the rear end of the tension plate curved downwardly and extending into a slot 36 so as not to form an obstruction to the feeding advancing of the strip particularly when loading.

The tension plate is bifurcated providing a pair of leaves or fingers with the forward ends inclined upwardly for compressing the tag strip against the under side of the closure plate 34. The elastic fingers of the tension plate hold the strip against retrograde motion during the retreat stroke of a reciprocating strip feeding pawl 37 and to apply a drag upon the strip as it is being advanced by the pawl.

The strip feeding pawl 37 at its rear end is formed to straddle the free end of an arm 38 to which the pawl is secured, the arm pivotally connecting with an upper end of a lever 39 (see Figure 4).

The opposite or lower end of the lever 39 is pivotally mounted upon a lug extending upwardly from the base of the machine frame 11. The lever intermediately carries a roller engaged into a cam groove 40 of the cam wheel 25 fixed on the shaft 9. The hinged or pivotal connection between the lever 39 and the arm 38 provides for a compensating motion between the connected parts to accommodate for an excessive lever stroke in a forward or strip feeding direction, the forward motion of the pawl being limited to a definite feeding stroke by engaging against a rigid stop necessary for bringing the edge notching of the strip and feeding slot in proper registration with a cutter for severing the tags from the strip and for advancing the severed tag a definite degree or distance to appropriately position the tag within the pinning mechanism.

The arm 38 and lever 39 are connected by a pin 41, the pin traversing an elongated slot 42 in the arm 38 and bears against a spring pressed plunger 43 (see Figure 5) within a bore longitudinally in the arm, the spring pressed plunger bearing against the connecting pin 41 under sufficient pressure for transmittingly connecting the pawl and its arm to the lever, over any retarding pressure of the strip so that the pawl will advance the strip when engaged therewith and moving in a feeding direction with the plunger yielding against any excessive motion of the lever after the motion of the pawl has been arrested at the end of its feeding stroke.

The pawl 37 centrally and longitudinally is slotted for receiving a second pawl 44 at one end pivotally mounted to the pawl 37 with the rear end of said second pawl up-turned and in engagement with a spring 45 for depressing the pawl 44 upon the tag strip when engaged thereon and with a forward advance of the pawl snapping into a slot 29 of the tag strip for connecting the pawl to the strip, the opposite end of the spring engaging against a shoulder formed and notching the forward end of the arm 38 into which the up-turned end of the pawl 44 extends. The pawl 44 on its lower side is provided with a tooth 46 for engagement successively with the slot 29 of the tag strip. The pawl 44 in its retreat position slides within a guide slot 47 in the cover plate 34 of the rail section 32 and upon an incline 48 of the cover plate 34 for elevating the tooth of the pawl from contacting with the tag strip, as the feeding stroke of the pawls is greater than the slot spacing in the tag strip and adapts the pawl to feed strips with the notching spacing varied for relatively different sizes of tags.

Figures 5, 6, 7, 8:
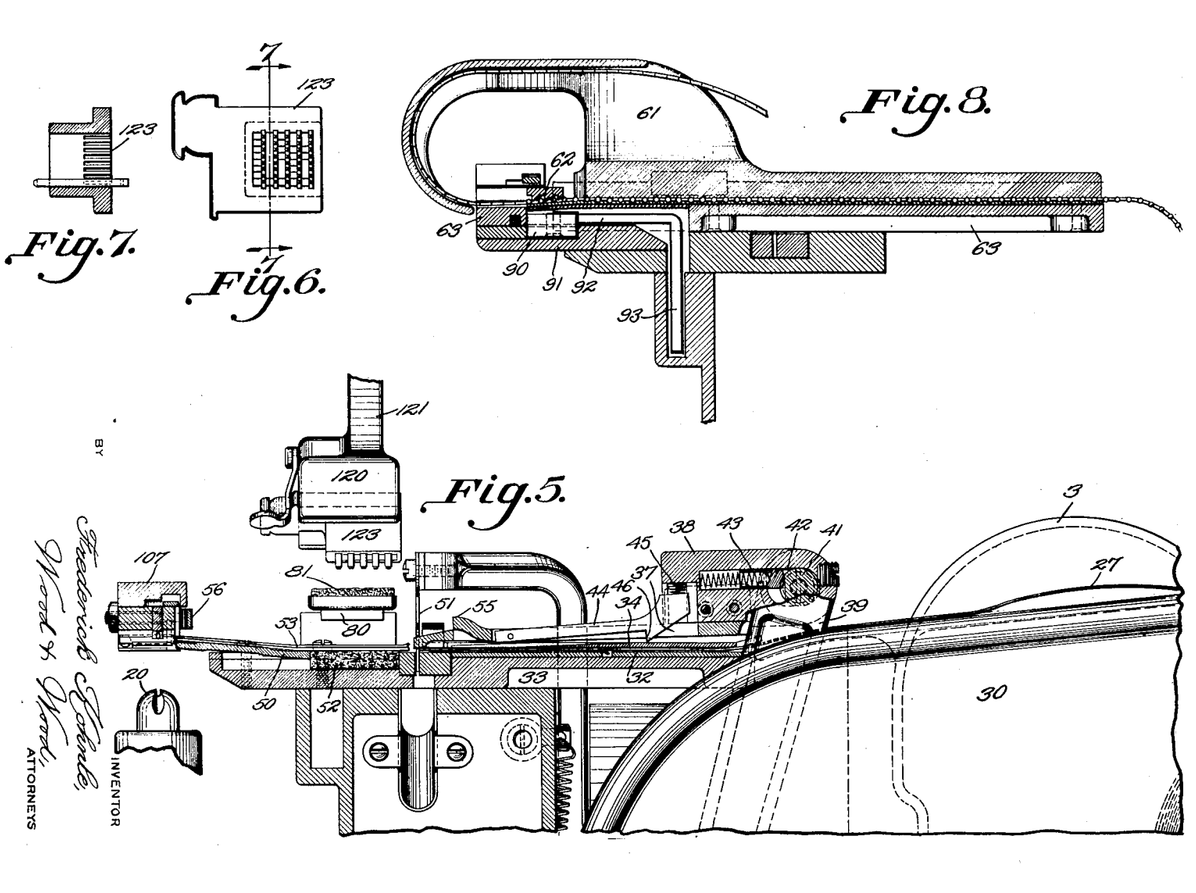
Figure 5 is a section on line 5—5, Figure 2.
Figure 6 is a top plan view of the type chase employed in a swinging printing head for printing the price marking data upon the tag which is ticketed to the goods or merchandise.
Figure 7 is a section on line 7—7, Figure 6.
Figure 8 is a section on line 8—8, Figure 2.
Figures 24, 25, 26, 27:
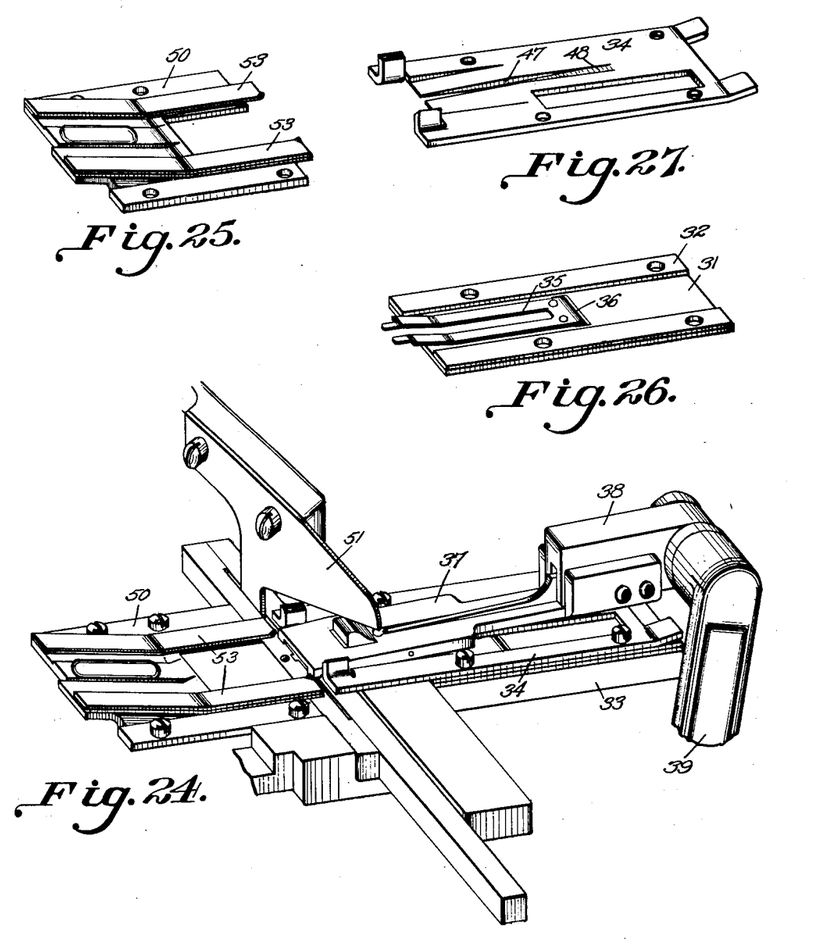
Figure 24 is a perspective view of the tag strip feeding mechanism, cutter for severing the tags from the strip, and track or rail sections over which the strip and severed tags are fed.
Figure 25 is a detailed perspective view of a front track or rail section upon which the severed tags are conveyed.
Figure 26 is a perspective view of the track section over which the tag strip is conveyed.
Figure 27 is a perspective view of the cover plate for the track section illustrated in Figure 25.

The forward end of the pawl 37 is squared for abuttingly engaging with an adjacent edge of a separate tag for moving the tag over a second section of a track or way 50 fixed to the table 33 beneath the stationary die 18 of the pinning mechanism. The two track sections 32, 50 are separated or spaced to provide a clearance for the cutter 51. The track or way 50 as shown in Figures 5, 24 and 25 has its rear end bifurcated or notched to border a pad 52 providing a yielding printing platen upon which the tags rest for printing the marking data thereon. The pad is supported within a recessed portion in the top of the table 33 and held against displacement by the rail section 50. The top of the pad is flush with the base of the channel of the rail section 32 for guiding the tags to the pinning mechanism, as advanced by the feeding pawls.

The second rail section or way 50 is provided with strips 53 overlying the channel guarding against vertical displacement of the tag within the channel or track way. The forward end of the track way is inclined upwardly and longitudinally embossed or recessed centrally of the channel to give a slight curvature to the tag as it is being pushed over the forward end of the rail and beneath the stationary die. The forward end of the rail section has one side slightly prolonged for sustaining the tag beneath the die before the tag is clamped by the anvil head of the plunger. The tooth feeding pawl 44 in a forward stroke of the feeding pawls after the tooth 46 engages into the slot of the tag strip, advances the strip, bringing the foremost tag of the strip over the printing platen 52 with the aligned notches in the edges of the strip in registration with the cutter 51 for printing the marking data upon the tag and severing tag from the strip. The feeding pawl 37, assuming that a previously or subsequently printed or severed tag is in position upon the printing platen engages with such tag, correspondingly advances the severed tag over the second section of the track or way and beneath the stationary die 18.

The tag feeding pawl 37 is provided with a shoulder 55 formed by depressing a portion of the body of the pawl or upper side of the pawl outwardly for engagement with a stop 56 fixed upon the rear side of a cross plate 63 as an element or part of the pinning mechanism. The cross plate 63 is removably fixed upon the top of the machine frame and provides the support for the various parts of the pinning mechanism which constitutes a unit capable of being bodily removable from the front end of the machine frame upon which it is secured.

The machine is principally designed for utilizing the common or commercial pin for pinning the tag to the fabric merchandise the pins being supplied from a paper strip, the strip carrying the pins in spaced parallelism inserted through crimps or corrugations longitudinally of the strip.

Figure 2:
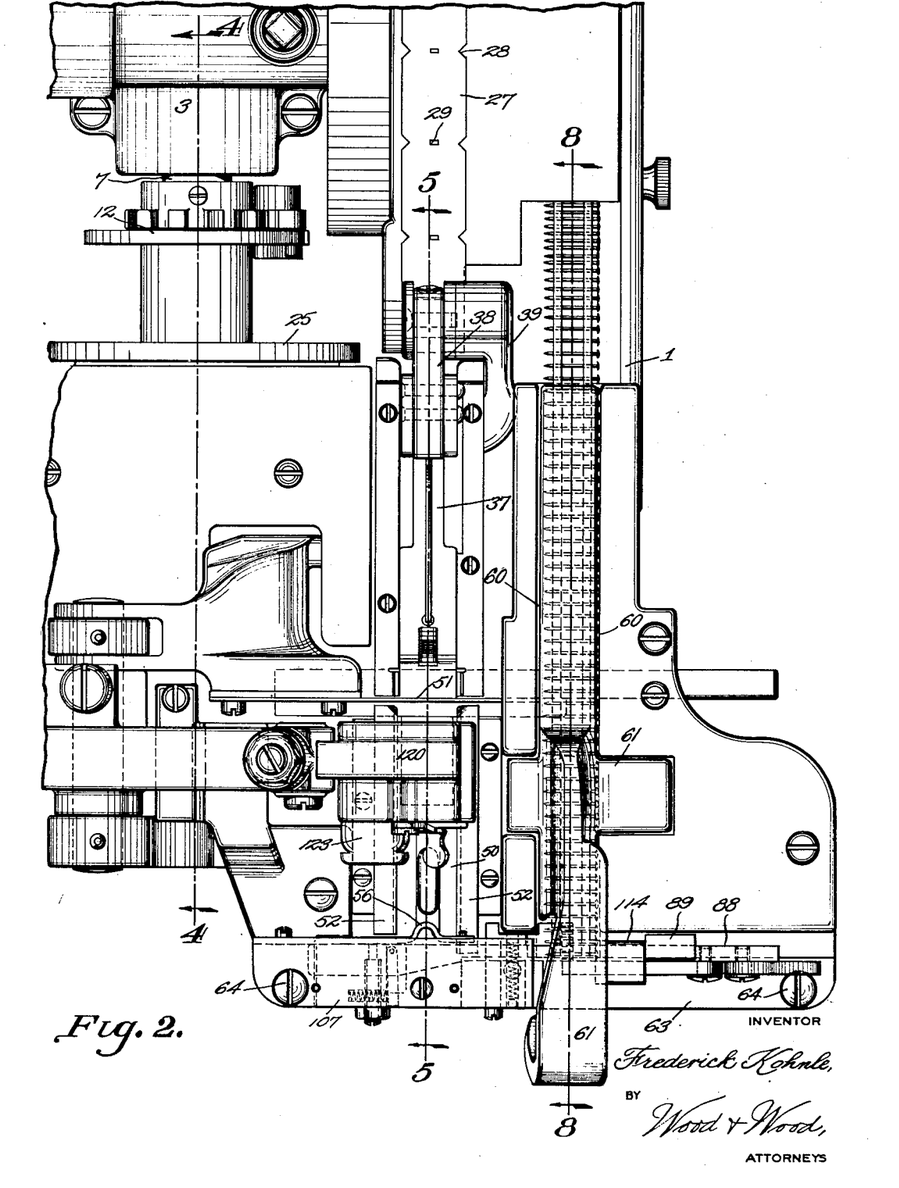
Figure 2 is a plan view of the forward portion of the machine omitting the full disclosure of the electric motor as any other form of drive may be employed.

The pin strip follows the general principle of papering pins excepting that the crimps or corrugations are along the margins or longitudinal edges of the strip so that a portion of the shank or head of the pin protrudes beyond an edge of the strip leaving the same in the clear for convenient access to the head of the pin for pin extraction or withdrawal from the strip by the pinning mechanism. The pin strip is preferably reel wound and the reel mounted upon a spindle similar to the tag reel and housed within the supply casing 30, the strip passing through an opening in the casing and upon a track or way within a channel plate 60 fixed upon the top of the machine frame. The channel or way is longitudinally parallel with the tag strip tracking and the pins and strip are covered by a tension or weight plate 61 resting upon the pins (see Figure 2) confining the pins and strip against vertical displacement and also furnishing the necessary tension or pressure for retarding the advance of the strip. The forward end of the weight plate 61 is arched to overhang a portion of the pinning mechanism and provide a curved or reverse bend track or guideway upwardly and rearwardly for the strip after the pins have been extracted therefrom out of way of interfering with the operation of the pinning mechanism.

Figures 20, 21, 22:
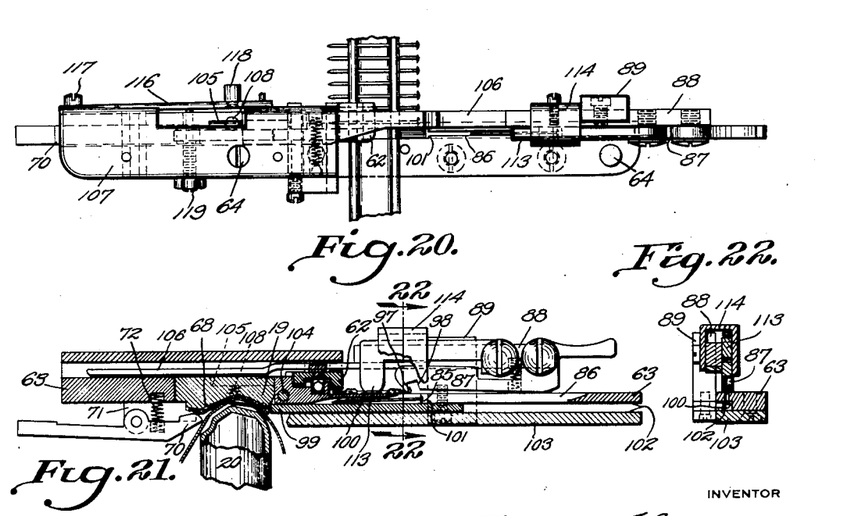
Figure 20 is a top plan view of the same.
Figure 21 is a central longitudinal section of the mechanism shown in Figure 20.
Figure 22 is a cross section on line 22—22, Figure 21.
Figure 23:
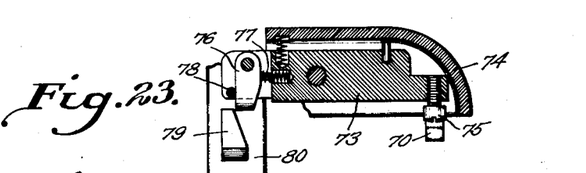
Figure 23 is a view similar to Figure 12, but of slightly modified construction.

The pin strip is intermittently advanced by a reciprocating ratchet 62 as an element of the pinning unit slidably and guidingly mounted in grooves or ways in the supporting cross plate 63. A portion of the ratchet overhangs the table surface of the cross plate 63 which the pin strip traverses and the lower side of the overhang is provided with a plurality of teeth, each tooth for engaging the rear side of a pin shank as shown in Figure 8 providing a connection between the ratchet and strip for feeding or advancing the pin strip a definite step or degree with each forward reciprocating stroke of the ratchet. The ratchet is spring pressed for automatically retreating the same by a spring engaged between a depending lug extending from the lower side of the ratchet with the opposite end of the spring engaging a pin fixed to the cross plate 63 within a spring housing traverse groove in the cross plate as shown in Figures 20 and 21. The ratchet is loosely mounted so that it can be swung upward in a retreat motion over the pins adapting the teeth of the ratchet to engage with a plurality of successive pins for a consecutive pin advance. The foremost pin of the strip in each feeding stroke is moved into registration with pin extracting mechanism which engages the head of the pin for withdrawing the pin from the strip.

The pin extracting and driving mechanism is a part of the pinning unit, the unit thus combining the pin strip feeding ratchet, and reciprocating pin extractor devices having the characteristics of a shuttle for withdrawing the pin from the paper strip and transfer it from the strip to a position in front of a driver, reciprocating with the extractor devices for driving the pin through the tag and merchandise which is curved or bowed by the die to clamping devices of which the upper stationary die is removably mounted within the cross plate 63 of the pinning unit.

As various parts of the pinning unit are subjected to the greatest wear, their organization into a self-contained removable unit removably mounted upon the top of the machine frame facilitates in assembly of the parts and is of convenience in making repairs or for renewing the worn parts which is of considerable advantage toward keeping the machine in good working order for obtaining the most efficient service.

The cross plate 63 as the base or support for the unit, is secured to the top of the machine frame by a pair of screws 64—64 at relative opposite ends of the plate 63 and the under side of the plate is recessed as at 65 correspondingly to the stationary die 19 to serve in conjunction therewith for giving the necessary curvature to the ticket and merchandise, to enable the pin to be driven therethrough in a straight line horizontally.

The die 19 in the form of a plate or hardened metal insert is thus intermediately mounted in the cross plate in a slot or groove thereof.

The under side or edge of the die 19 for its forward portion thereof is grooved or channeled as at 68 to provide a curved anvil surface for guidingly confining the point end of the pin and for directing the same downwardly as it is being driven through the tag and merchandise to deflect the same into the tag for guarding the point, but as in the preferred method illustrated, directing the pin to pass through the tag to the reverse or under side of the ticket and then to be directed or pressed upwardly to prick the pin point into the tag to protect or guard the same.

Figure 16:
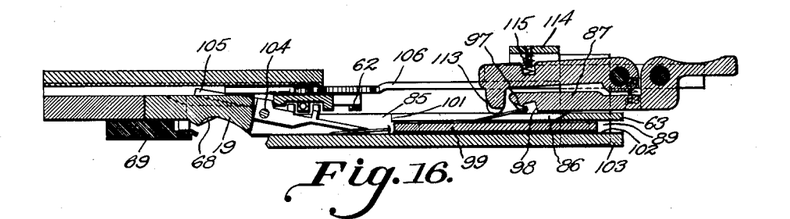
Figure 16 is a central longitudinal section through the same illustrating the reciprocating claw for extracting the pin from the paper strip as well as the driver which unitarily moves with the extractor in their retreat position.
Figure 17:
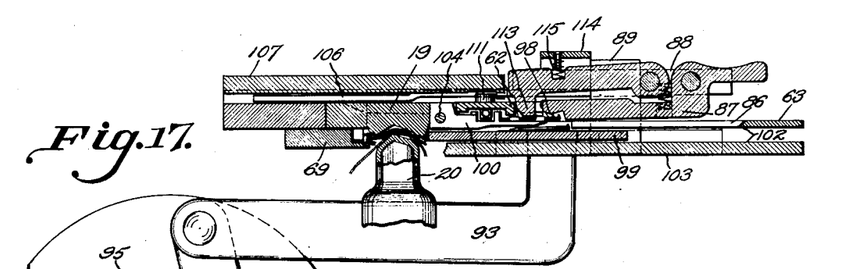
Figure 17 is a sectional view similar to Figure 16 with the reciprocating parts in their extreme forward position, the illustration also including the mechanism for reciprocating the combined extractor and driver as well as the anvil plunger and stationary die between which the ticket and merchandise are clamped for a printing operation.
Figure 18:
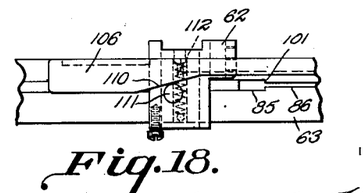
Figure 18 is a detail top plan view of the pin strip feeding mechanism and the actuator rod for reciprocating the pin strip feeding mechanism coordinately and in relatively timed relation to the operation of the pin extractor and driving mechanism.
Figure 19:
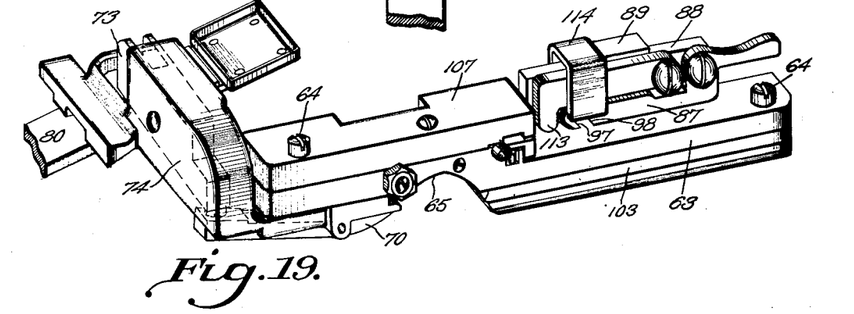
Figure 19 is a perspective view similar to Figure 15 with some of the parts modified.

In the drawings two methods are disclosed for operating upon the pin point below the tag. In one method a stationary die plate 69 is employed, fixed to the under side of the cross plate 63 having a pin deflecting lip as shown in Figures 16 and 17 in relation to the stationary die 18 for guiding and deflecting the pin point or point end of the pin upwardly against the under side of the tag to prick the point into the tag. This die plate 69 also serves as a ledge or edge support for the tag to hold the same aloft in a horizontal position preliminary to inserting the merchandise and clamping or compressing the tag and merchandise for a pinning operation.

In the modified form shown in Figures 18 to 21 inclusive, a swinging finger 70 is pivotally mounted upon a bracket 71 fixed to the under side of the cross plate 63. The bracket is slotted to straddle the finger and clear the forward end or edge of the stationary die with which the finger cooperates for deflecting the point end of the pin against the under side of the tag, the finger also serving as a clamp for the tag to preliminarily hold the same beneath the stationary die.

Figure 12:
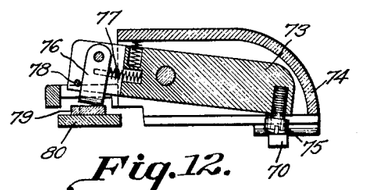
Figure 12 is a section on line 12—12, Figure 11.
Figure 13:
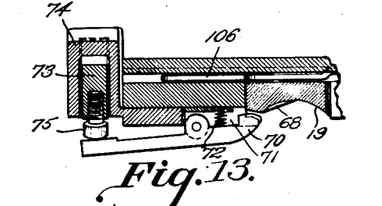
Figure 13 is a section on line 13—13, Figure 11.
Figure 14:
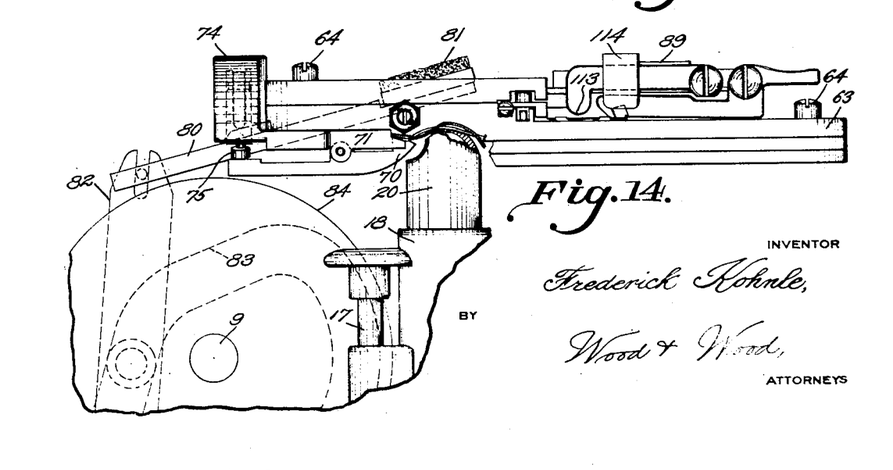
Figure 14 is a side elevation of the pin extractor mechanism for successively extracting the pins arranged in spaced parallelism upon a paper strip; the pins in withdrawal from the paper strip are shuttled to successively bring the same before a driver, the driver pushing the pins through the tag and merchandise which are appropriately clamped for ticketing the merchandise.

The finger is spring pressed to normally maintain the forward end away from the stationary die 19 by a spring 72, one end engaged in a socket in the finger and the opposite end in a socket in the lower side of the plate 63. The swinging finger 70 is actuated by a rock bar 73 (see Figures 12, 13, 23) pivotally mounted within a bracket 74 housing the rock bar, the bracket being mounted and fixed to the top of the machine frame (see Figure 11). The rock bar 73 is positioned at right angles to the finger 70 and its forward end is provided with a set screw 75 bearing against the rear end of the finger 70.

In view of this disclosure it will be observed as characteristic of this invention:

That a major portion of the tag extending between the dies is to be curved for pinning the tag to the fabric;

That a minor marginal portion of the tag projecting beyond the dies is to be used for guarding the pin point;

That this pin point, after fabric attachment, and this guard portion of the tag are sustained between the movable support member 70 and the abutment member 19;

That when the movable support is actuated, a relative movement of the advancing pin point and of this supported edge of the tag occurs;

And that this relative movement causes this guard portion of the tag to intercept the final movement of the pin in a manner to establish a guard relationship of the tag and pin point.

The opposite end of the rock bar 73 is bifurcated for receiving and straddling a swinging link 76 pivotally mounted to the rock bar 73 and spring pressed outwardly by a spring 77 against a stop pin 78 engaged through the limbs of the bifurcated end of the rock bar. The link engages a cam block 79 fixed upon a reciprocating slide 80, the forward end of the slide 80 carrying an inking pad 81 for inking the type of the printing mechanism. The slide 80 is reciprocated by a lever 82 having its lower end pivotally mounted upon an upstanding lug of the machine frame.

The lever 82 intermediately carries a roller engaged into a cam groove 83 of a cam wheel 84 fixed upon the driven shaft 9. The cam block 79 actuates the rock bar 73 which in turn depresses the rear end of the finger 70 pressing the forward end against the die 18 for clamping the ticket in position beneath the die and also serving as an anvil for shunting the forward point end of the pin into the lower side of the tag.

The pin strip feeding ratchet 62 in each strip advancing stroke, brings the foremost pin of the strip or pin next in order to be extracted in registration and alignment over a longitudinal slot 85 in the cross plate 63, the slot being accessible from the top of the plate and for a portion of its length as a forward portion is of a width to receive the head of the pin and is of a restricted width for a rearward portion 86 accessible only by the shank of the pin, with the head resting and sliding over the restricted portion of the groove or slot 86 as the pin is being withdrawn from the pin carrying strip.

For extracting the pin from the strip, the head is engaged by a spring depressed claw 87 pivotally mounted upon a horizontal cross bar 88 fixed upon a slide block 89 slidable along the rear longitudinal side of the cross plate 63. The slide block 89 is engaged into a notch of a slide block 90 (see Figure 8) guidingly and slidably mounted upon a table plate 91 rigid upon the machine frame. The connection between the slide blocks 89 and 90 is a socketed one, enabling the parts to be readily disengaged in removing the extractor and pinning unit. The slide block 90 is pivotally connected to a horizontally extended arm 92 of a link 93. The link 93 is shown in dotted line in Figure 3 and is pivotally connected to the upper end of a lever 94. The lever 94 at its opposite end is pivotally connected to a stationary support and intermediately is provided with a roller engaging into a cam groove 95 of a cam wheel 96 fixed upon the driven shaft 9. With each rotation of the cam wheel 96, the slide 89, with the pin extracting claw, is reciprocated in appropriate timing.

The head end of the claw is notched to provide a tooth 97, the edge of the tooth riding upon the upper surface of the cross plate 63 over the groove 85—86 and the tooth centrally is notched or bifurcated to straddle the shank of the pin when engaged with the head of the pin, as shown in Figure 21.

In the forward stroke of the claw, the claw tooth having its forward side inclined or bevelled, will slip over the pin head to engage with the rear side thereof, thus connecting the claw with the pin to withdraw the pin from the pin strip in a retreat stroke of the claw. The pin as it is being withdrawn, is retained in a horizontal plane until the point end clears the edge of the strip, whereupon the shank of the pin will drop by gravity into the groove or slot and dragged in an inclined position as shown in Figure 16 as the claw continues in its retreat stroke, the head end being confined against descent by the restricted width of the slot 86, is thus held in connection with the tooth of the claw. With a successive forward stroke of the extractor claw, the head of the pin engages against a shoulder 98 in rear of the claw tooth so that the pin is pushed forward in its inclined position as shown in Figure 16, the point end being engaged through the slot 86 and rests upon the top of the driver 99.

Toward the end of the forward stroke of the claw with the pin in an inclined position, the point end will be advanced beneath a depressible finger 100 and as soon as the head of the pin reaches the enlarged width of the groove or way 85, clearing the restricted groove portion 86, it releases from the claw by gravity, the head dropping upon the top of the driver as shown in Figure 17. The depressible finger being in its upward position, serves to cam the pin downwardly insuring its release from the claw tooth as the head is brought into registration with the large width portion of the groove 85.

In the forward stroke of the claw, the claw engaging with a successive pin to withdraw the same from the strip in a retreat stroke while the subsequently withdrawn pin lies at a second elevation upon the driver with the head in position to engage with the shoulders 101 at the head end of the reduced or restricted width of groove 86, so that the pin is held against traverse with the retreat stroke of the claw and driver, the claw and driver reciprocating as a unit. The driver is fixed to the slide block 89 and is slidably confined within a groove or way 102 formed in the lower side of the cross plate 63 and a cover plate 103 secured to the lower or under side of the cross plate 63. The pin lying upon the driver with the retreat of the driver, permits the driver to slide from beneath the pin, the pin descending after the driver is cleared to a third elevation within the driver way and upon the cover plate 103 so as to lie in front of the driver as shown in Figure 16 for driving the pin through the tag and merchandise in a forward stroke of the driver.

The depressible finger 100 is recessed within the pin-way 85 and pivoted by a pin 105, extending laterally through the cross plate 63. The forward end of the finger serves to partially cover the pin-way 85 (see Figure 1) with the upper surface thereof flush with the track way for the pin strip as a support for the pin and strip when the claw and driver move in a forward stroke and also serve as a guard for directing a subsequently withdrawn or extracted pin to a second or intermediate stage in transferring the pin from the strip to a position in front of the driver. In the second stage the pin is pushed beneath the finger to lie upon the driver. The finger 100 is provided with an offset lever arm 105 recessed within the cross plate 63 and adjacently parallel to the rear side of the die 19 for engagement with a rod 106 overlying the arm 105 and fixed to and extending longitudinally from the cross bar 88 of the slide block 89 and moves within a guideway in the under side of a cover plate 107 fixed upon the top of the cross plate 63. The cover plate 107 also provides a closure for the pin strip feeding ratchet 62.

The rod in sliding over the lever arm 105 depresses the lever arm in a forward stroke of the slide and in a retreat stroke releases the arm for automatically depressing the finger by means of a spring 108, socketed in the cover plate 63 and engaging the lower side of the lever arm 105. The depressing motion of the finger serves to forcibly depress the pin for disengaging the head from the claw tooth. The rod 106 is provided with a cam edge 110 for engaging a pin 111 fixed to and extending upwardly from the pin strip feeding ratchet 62 for actuating the ratchet, in the reciprocating strokes of the rod and slide 89. The rod positively moving the ratchet in a direction for pin strip advance, the ratchet retreating under the tension of a spring 112.

The ratchet 62 slides transversely of the cross plate 63 and is slidably sustained in a groove in the upper surface of the cross plate, as shown in Figures 16 and 17 and spring pressed by a spring 112 housed within a cross groove in the upper surface of the cross plate 63, one end of the spring engaging a lug depending from the lower side of the ratchet and the opposite end of the spring against a shoulder or pin in the groove of the cross plate.

A presser finger 113 is pivotally mounted upon the cross arm 88 of the slide 89 above the extractor claw 87. The forward end of the presser finger 113 extends downwardly in advance of the forward end of the claw and has its lower edge notched or grooved to straddle the shank of the pin when the finger is engaged over the pin carrying strip as shown in Figures 17 and 21 for depressing the pin and strip, and hold the same against vertical displacement during a pin-extracting or withdrawing operation. The finger serves to maintain the pin in a horizontal plane while it is being extracted or withdrawn from the strip and until the head of the pin is carried beyond the forward portion of the pin-way and advanced onto the restricted width of pin-way to prevent it from becoming dislodged from the claw.

The tension finger also serves to centralize the pin with the extractor claw and pin-way, accounting for any slight inaccuracies in the strip feed or spacing of the pins in the strip.

The claw 87 and presser finger 113 are confined within a saddle 114 in the form of a U clip fixed to the cross bar 88 of the slide 89 limiting the upward swing of said members, particularly when manually depressed. The presser finger is yieldingly depressed by a spring 115 socketed within the upper edge of the finger as shown in Figure 17 and engaged over a pin extending downwardly from the cross bar portion of the saddle 114.

Figure 15:
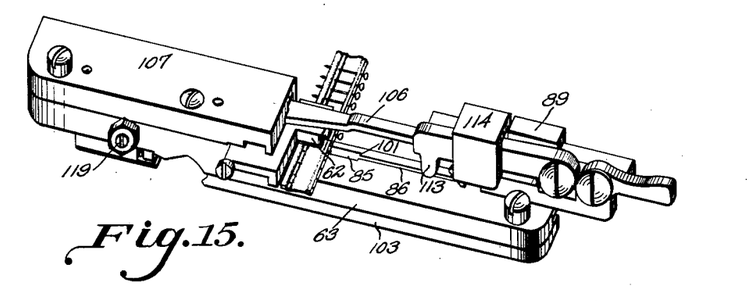
Figure 15 is a perspective view of the pin extractor and driving mechanism.

The slide normally is at rest at the end of a retreat stroke as shown in Figures 15 and 16 with the presser finger and claw normally bearing and sliding upon the upper surface of the cross plate 63 and overlying the pin-way in the plate 63 adapting the same to snap over the pin in the strip in the forward stroke of the slide as shown in Figures 17 and 21, the claw engaging the rear side of the head of the pin, coupling the pin to the claw for withdrawal from the strip in a retreat stroke of the slide. As soon as the pin point end clears the strip, the shank portion of the pin will drop into the pin-way 85 and upon the driver in the cross plate 63 with the head confined against descent by the edges of the restricted portion of the pin-way, inclining or canting the pin as shown in Figure 16, the pin resting upon the driver and the head coupled to the claw in which position the pin is sustained for the continued retreat stroke of the slide.

With the pin in an inclined position, for a succeeding forward stroke of the slide it will be pushed by the claw below the finger 100 adapting the head to become dislodged from the claw as it is moved off of the end of the restricted width portion 86 of the pin-way and dropped by gravity upon the driver as shown in Figure 21 as a second stage in the extracting and transferring operation of the pin from the pin carrying strip to a position in front of the driver.

In a retreat stroke of the slide the pin now lying upon the driver is arrested against conveyance with the driver by the shouldered abutments 101 in the pin-way due to the differential widths of the pin-way so that the driver is drawn from beneath the pin and when cleared therefrom drops by gravity or is forcibly depressed by the finger 100 which is swung downwardly.

In a retreat stroke of the slide, the push rod 106, toward the end of the slide stroke releases its engagement with the lever arm 105 of the finger 100 allowing the finger to be automatically depressed and engage the pin, thus forcibly dropping the pin upon the base of the pin-way in front of the driver as shown in Figure 16, whence it is pushed by the driver in a forward stroke of the slide or driver into the tag and merchandise for pinning the tag to the merchandise as shown in Figures 17 and 21.

In each retreat stroke of the slide and after the slide has moved a distance sufficient to withdraw a pin, the cam edge 110 of the push rod 106 will shift the strip feeding ratchet 62 a degree sufficient to bring the next successive pin in alignment or registration with the pin-way to be engaged and withdrawn by the reciprocating claw. Thus for each retreat stroke of the slide, a pin is extracted or withdrawn from the pin strip and a subsequently extracted pin is positioned in front of the driver and with each forward stroke a pin is moved to a second stage below the pin strip and a second pin pushed by the driver and driven through the tag and material.

The mechanism provides for high speed operations with little opportunity of becoming clogged and the pin extracting and transferring unit is very compact, easily removed for making repairs and readily interchangeable for a new or other unit if change in pin length is required.

Figure 11:
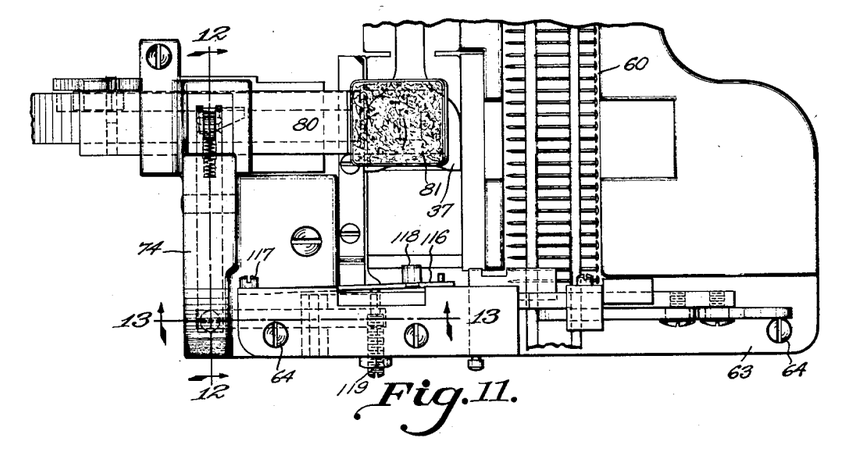
Figure 11 is a detail top plan view of the forward position of the machine with parts removed for the purpose of illustrating certain parts which would be otherwise hidden.

In Figures 11 and 20 a modified form of stop of the tag feeding pawl 37 is illustrated, comprising a bar 116 fixed to the rear side of the cross plate 63 by a screw 117. The stop bar has a laterally extending lug or pin 118 for abuttingly engaging with the shoulder 55 of the pawl 37. The stop is adjusted by a set screw 119 screw-threaded and extending transversely through the cross plate 63 and engaging with the stop bar wherewith the stop bar can be micrometrically set for obtaining a definite limit for the feeding stroke of the tag feeding pawls for bringing the tags in absolute registry with the severing, inking and printing mechanism.

Figure 9:
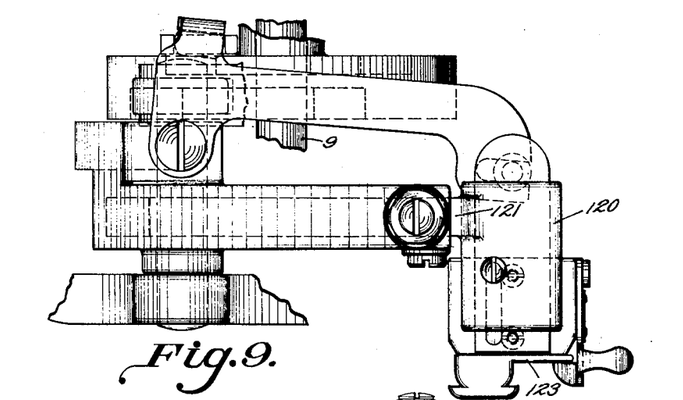
Figure 9 is a detail top plan view of the printing mechanism for printing the marking data upon the tag.
Figure 10:
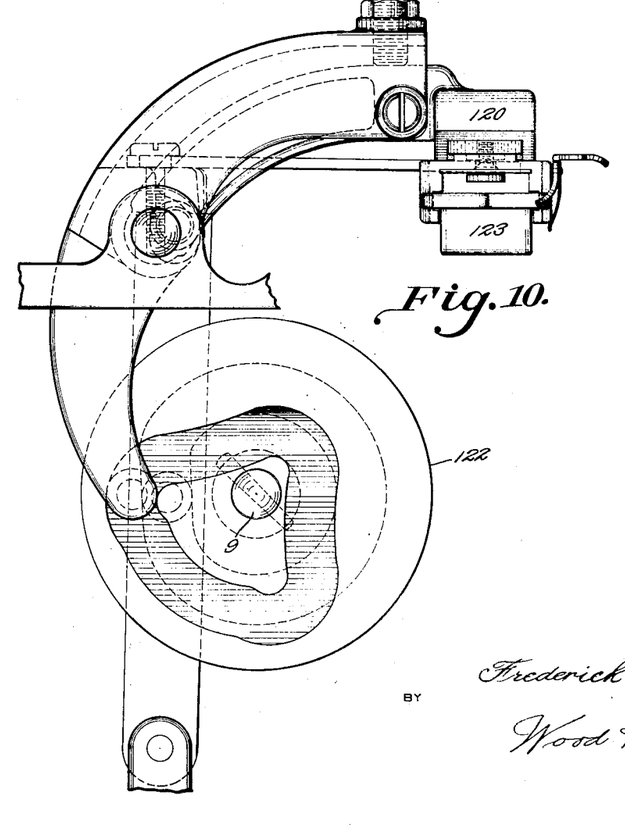
Figure 10 is a side elevation thereof.

Figures 3, 9, and 10 disclose the printing mechanism which in structure and operation may be characteristic of the printing mechanism disclosed in the aforementioned patent, primarily constituting a swinging printing head and a reciprocating inking pad. The printing head normally is in a retracted position and in which operating cycle swings downwardly depressing the type upon the tag for a printing impression, a slight impression dwell being allowed to secure a good impression whence the head is retracted and in appropriate sequence the inking pad is moved into position, the head thereupon moving downwardly for a partial stroke to impress the type upon the pad, the parts cooperating under a sufficient pressure and a dwell in the movement of the parts being allowed for an efficient inking of the type. The head and inking pad are then retracted to their normal positions.

As the printing mechanism is classifiable separate and divisional from the tag attaching mechanism only a brief reference thereto will be made herein. The printing mechanism therefor, as disclosed, constitutes a printing head 120 at the end of and integral with the lever 121. The lever has an arm extending downwardly and engaging with a cam wheel 122 fixed on the driven shaft 9. The head is constructed for removably securing thereto a type chase 123 and the chase replaceably holding type set for composing the marking data upon the tag.

Having described my invention, I claim:

1. In a machine of the class described, a magazine for successively receiving pins from a pin carrying strip for transfer of the pins from the strip to a position in front of a driver, having a longitudinal pin-way, a hingedly mounted claw reciprocable over said way, a driver beneath said claw, reciprocable as a unit therewith and providing a movable base for said way, the claw in one stroke snapping over and engaging with the head of a pin in the pin carrying strip aligned with said way and in a reverse stroke withdrawing the pin from the strip for deposit into the way with the point end of the pin resting upon the driver and subsequent reciprocations of said claw and driver staging the pin for deposit in front of the driver, the driver forcing the pin through the material to be fastened together by the pin.

2. In a machine of the class described, a magazine for successfully receiving pins from a pin carrying strip for transfer of the pins from the strip to a position in front of a driver, having a longitudinal pin-way, a yielding claw reciprocable over said way, a driver beneath said claw, reciprocable as a unit therewith and providing a movable base for said way, a presser finger in advance of the claw reciprocable therewith, the claw in one stroke snapping over and engaging with the head of a pin in the pin carrying strip aligned with said way, and in a reverse stroke withdrawing the pin from the strip for deposit into the way and subsequent reciprocations of said claw and driver staging the pin for deposit in front of the driver, the driver forcing the pin through the material to be fastened together by the pin.

3. In a machine of the class described, a magazine for successively receiving pins from a pin carrying strip for transfer of the pins from the strip to a position in front of a driver, having a longitudinal pin-way, a yielding claw reciprocable over said way, a driver beneath said claw, reciprocable as a unit therewith and providing a movable base for said way, the claw in one stroke snapping over and engaging with the head of a pin in the pin carrying strip aligned with said way and in a reverse stroke withdrawing the pin from the strip for deposit into the way and subsequent reciprocations of said claw and driver staging the pin for deposit in front of the driver, the driver forcing the pin through the material to be fastened together by the pin and clamped to the underside of the base, in position to receive the pin.

4. In a machine of the class described, a magazine for successively receiving pins from a pin carrying strip for transfer of the pins from the strip to a position in front of a driver, having a longitudinal pin-way, a reciprocable pin extractor and driver, the extractor sliding over the pin-way and in one stroke snapping over and engaging over the head of a pin in the pin carrying strip and aligned with said way and in a reverse stroke withdrawing the pin from the strip for deposit into the way and subsequent reciprocations of said extractor and driver staging the pin within said way for deposit in front of the driver, the driver forcing the pin through the material to be fastened together by the pin.

5. In a machine of the class described, a magazine for successively receiving pins from a pin carrying strip for transfer of the pins from the strip to a position in front of a driver, providing a support for the pin carrying strip and a longitudinal pin-way, a unitary reciprocable pin extractor, pin strip presser finger and driver, the extractor and presser finger sliding over the pin-way and in one stroke the presser finger snapping upon the strip and the extractor over and into engagement with the head of a pin in the pin carrying strip and aligned with said way, and in a reverse stroke withdrawing the pin from the strip for deposit into the way and subsequent reciprocations of said extractor and driver staging the pin within said way for deposit in front of the driver, the driver forcing the pin through the material to be fastened together by the pin.

6. In a machine of the class described, a magazine for successively receiving pins from a pin carrying strip for transfer of the pins from the strip to a position in front of a driver, providing a support for the pin carrying strip, and longitudinal pin-way means movable transversely to said pin-way for feeding said pin carrying strip, a reciprocable pin extractor and driver, the extractor sliding over the pin way and in one stroke snapping over and engaging over the head of a pin the pin carrying strip and aligned with said way, and in a reverse stroke withdrawing the pin from the strip for deposit into the way and subsequent reciprocations of said extractor and driver staging the pin within said way for deposit in front of the driver, the driver forcing the pin through the material to be fastened together by the pin.

7. In a machine of the class described, a magazine for successively receiving pins from a pin carrying strip for transfer of the pins from the strip to a position in front of a driver, comprising, a base providing a support for a pin carrying strip and having a longitudinal pin-way, means slidable upon said base for translating the pin carrying strip to successively bring the pins of the strip into alignment with said pin-way, a reciprocable pin extractor and driver, the extractor for withdrawing the pin from the strip and transferring the same in said pin-way to a position in front of the driver so that the pin may be driven through the material positioned in relation to the driver for pinning the parts of the material together, said extractor having an operative connection with said pin strip translating means.

8. In a machine of the class described, a magazine for successively receiving pins from a pin carrying strip for transfer of the pins from the strip to a position in front of a driver, providing a support for a pin carrying strip and means slidable upon said support for translating the pin carrying strip to successively bring the pins of the strip into a position for extraction from the strip, a reciprocable pin extractor and driver, the extractor withdrawing the pin from the strip and cooperating with the driver for transferring the same to a position in front of the driver so that the pin may be driven through the material positioned in relation to the driver for pinning the parts of the material together, said extractor having an operative connection with said pin strip translating means.

9. In a machine of the class described, a magazine for successively receiving pins from a pin carrying strip for transfer of the pins from the strip to a position in front of a driver, providing a support for a pin carrying strip, a pin extractor reciprocable over the pin strip engaging with the head of a pin in the strip for withdrawing the pin from the strip and depositing the same to a stage below the plane of the pin strip from which it is transferred through the reciprocation of said extractor to a position in front of a driver, and a reciprocable driver for forcing the pin through material to be pinned together positioned in relation to the driver to receive the pin.

10. In a machine for pinning price tags to merchandise, in combination with the complementary elements thereof, an elongated base comprising a concave anvil member, a pin point directing member, a pin strip feed member, a pin magazine providing a pin-way, a pin extractor reciprocating over the pin-way, a pin driver reciprocating in the pin-way, and means coacting with the extractor and driver to mechanically control the pins in the pin-way whereby they are transferred in stages from the plane of extraction to the plane of insertion and successively placed in front of the driver.

11. In a machine of the class described, a magazine for successively receiving pins from a pin carrying strip for transfer of the pins from the strip to a position in front of a driver, for supporting a pin carrying strip, a pin extractor reciprocable over the pin strip engaging with a head of a pin in the strip for withdrawing the pin from the strip and depositing the same to a stage below the plane of the pin strip from which it is transferred through the reciprocation of said extractor to a position in front of a driver, a reciprocable presser finger for engaging over the pin and depressing the pin strip upon the table during the extraction of the pin from the strip, and a reciprocable driver for forcing the pin through material to be pinned together positioned in relation to the driver to receive the pin.

12. In a machine for pinning price tags to merchandise, in combination with the complementary elements thereof, a pin strip feed member, a pin magazine, a reciprocating presser finger for engaging over the pin for centralizing the pin with an extractor and pin-way, a reciprocating pin extractor, a reciprocating pin driver, the pin magazine providing a pin-way, and means coacting with the extractor and the driver whereby during the reciprocations thereof the pin is mechanically controlled in the pin-way and transferred in stages from the plane of extraction to the plane of insertion and placed in front of the driver.

13. In a machine of the class described, a magazine for successively receiving pins from a pin carrying strip for transfer of the pins from the strip to a position in front of the driver, providing a support for a pin carrying strip and a longitudinal pin-way, means within the magazine movable transversely to the pin-way for translating the pin carrying strip, successively bringing the pins of the strip into registration with the pin-way for extraction from the strip, a pin extractor, pin strip presser finger and driver reciprocable as a unit, the extractor withdrawing the pin from the strip and cooperating with the driver for transferring the same to a position in front of the driver so that the pin may be driven through material to be pinned together positioned in relation to the driver.

14. In a machine of the class described, a magazine for successively receiving pins from a pin carrying strip for transfer of the pins from the strip to a position in front of the driver, providing a support for a pin carrying strip and a longitudinal pin-way, means within the magazine movable transversely to the pin-way for translating the pin carrying strip, successively bringing the pins of the strip into registration with the pin-way for extraction from the strip, a pin extractor, and driver reciprocable as a unit, the extractor withdrawing the pin from the strip and cooperating with the driver for transferring the same to a position in front of the driver so that the pin may be driven through material to be pinned together positioned in relation to the driver, and a depressible finger movable in said pin-way for depressing the pin to its final stage within the magazine in front of the driver.

15. In a machine of the class described, a magazine for successively receiving pins from a pin carrying strip for transfer of the pins from the strip to a position in front of the driver, providing a support for a pin carrying strip and a longitudinal pin-way, means for translating a pin carrying strip, successively bringing the pins of the strip into registration with the pin-way for extraction from the strip, a pin extractor, pin strip presser finger and driver reciprocable as a unit, the extractor withdrawing the pin from the strip and cooperating with the driver for transferring the same to a position in front of the driver so that the pin may be driven through material to be pinned together positioned in relation to the driver, and a depressible finger movable within said pin-way for depressing the pin to its final stage within the magazine in front of the driver.

16. In a machine of the character disclosed, opposing dies, one thereof movable for clamping a tag and material to be tagged therebetween giving the same a curved form for the reception of a pin longitudinally pushed through the tag and material and a swinging clamping member movable against the stationary die for clamping an edge of the tag therebetween preliminarily sustaining the tag between the dies.

17. In a machine of the character disclosed, opposing dies, one thereof movable for clamping a tag and material to be tagged therebetween giving the same a curved form for the reception of a pin longitudinally pushed through the tag and material and a swinging clamping member movable against the stationary die for clamping an edge of the tag therebetween preliminarily sustaining the tag between the dies, one of said dies providing an anvil for directing the point of the pin into the tag to guard the same.

18. In a machine of the character disclosed, opposing dies, one thereof movable for clamping a tag and material to be tagged therebetween giving the same a curved form for the reception of a pin longitudinally pushed through the tag and material and swinging clamping member movable against the stationary die for clamping an edge of the tag therebetween preliminarily sustaining the tag between the dies, said stationary die providing an anvil for directing the point of the pin finally through the tag, and said clamping member also constituting an anvil to direct the point of the pin into the underside of the tag to guard the same.

19. In a machine for pinning a price tag to fabrics, a stationary and a movable die having complementary curved surfaces for imposing a curvature to a portion of the tag to be pinned to the fabric, a movable support for sustaining a portion of the tag projected beyond the portion to be curved, means for driving a pin longitudinally through the curved portion of the tag and fabric to advance its point over the tag portion sustained by the movable support, means for feeding pins to said driving means, a movable support actuator adapted to reciprocate the movable support for imparting relative movement to the supported tag portion and the advancing pin point, and an abutment member above the tag and movable support coacting with the latter to guard the pin point in a portion of the tag projected beyond the portion of the tag which is pinned to the fabric.

20. In a machine for pinning a price tag to fabrics, a stationary and a movable die having complementary curved surfaces for imposing a curvature to a portion of the tag, a movable support adjacent the stationary die for sustaining a portion of the tag projecting beyond the portion to be curved, time-actuated pin feeding and pin driving mechanisms adapted to insert a pin longitudinally through the curved portion of the tag and fabric and to advance its point over the supported edge of the tag, means for actuating said movable support, and an abutment member coacting with said movable support whereby a relative movement is imparted to the tag portion and the pin point, delivering the pin point into the tag at the completion of the longitudinal movement of the pin.

21. A device for consecutively extracting pins from a pin strip, the pins mounted in spaced parallelism transversely of the strip and positioning each extracted pin in advance of a driver, comprising, a support for sustaining a portion of the pin strip, a pin extractor reciprocable transversely of the pin strip and engaging with the head of a pin in the strip to withdraw the same therefrom in a retreat stroke of the extractor, and means engaging one or more pins of the strip operatively connecting with said extractor for advancing the strip coordinately during the pin extracting stroke of said extractor.

FREDERICK KOHNLE.